Feb. 20, 1940.  C. T. HAZEL  2,191,127
ELECTROCUTING TRAP
Filed March 11, 1939
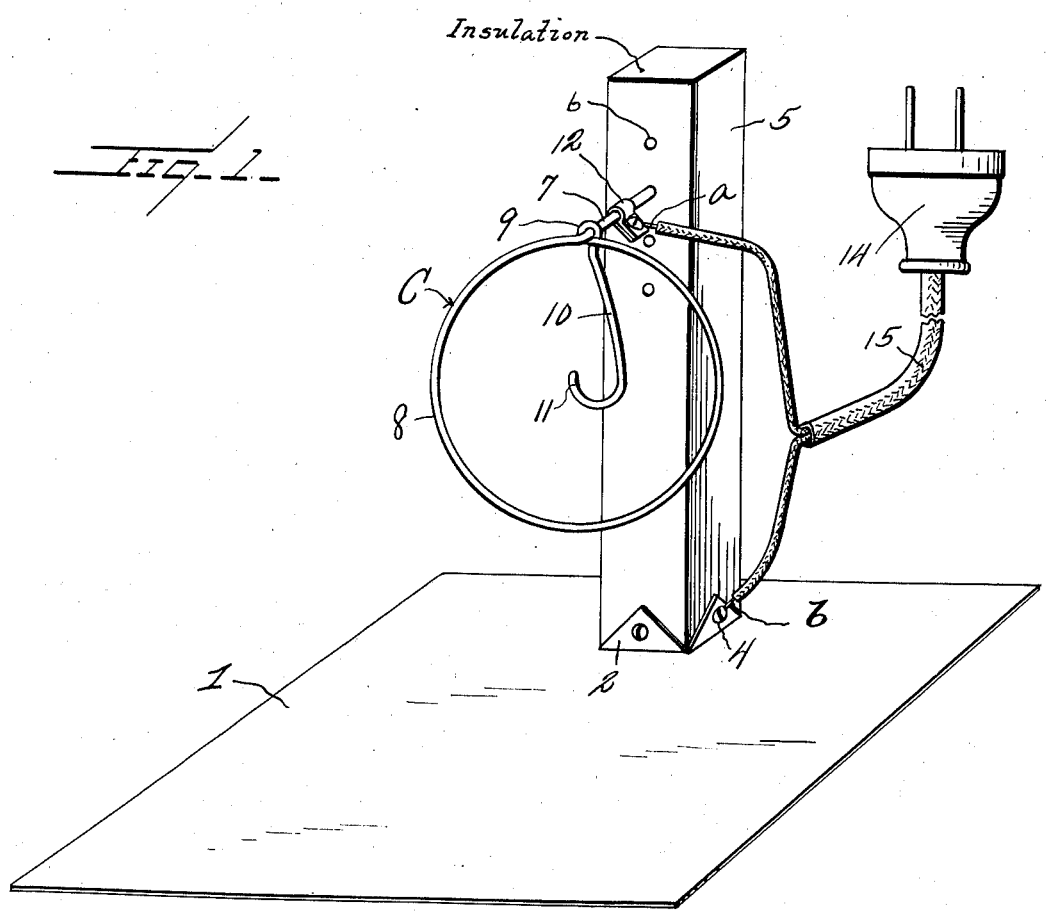
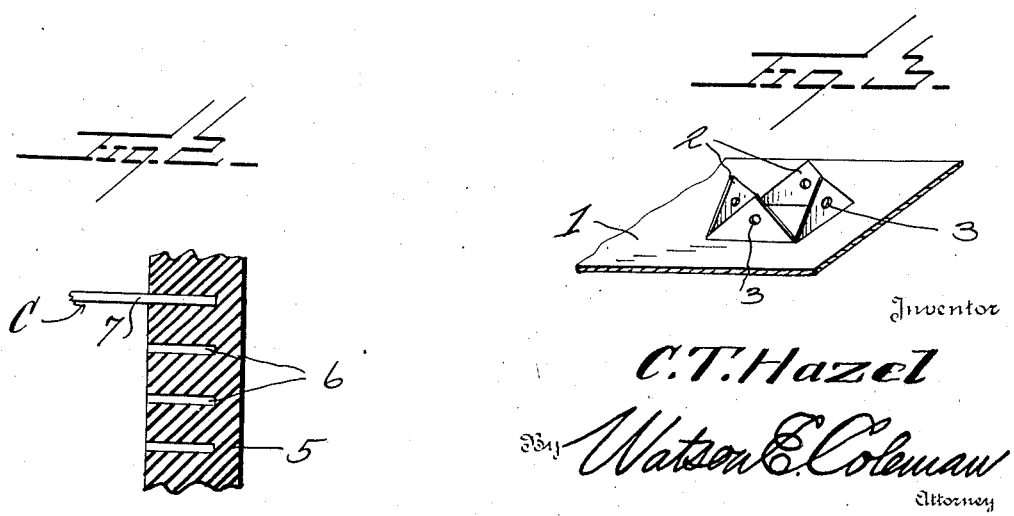
Inventor
C. T. Hazel
By Watson E. Coleman
Attorney Patented Feb. 20, 1940

2,191,127

UNITED STATES PATENT OFFICE 2,191,127

ELECTROCUTING TRAP

Clair T. Hazel, Pleasant Gap, Pa., assignor of one-half to Ray C. Noll, Pleasant Gap, Pa.

Application March 11, 1939, Serial No. 261,267

1 Claims. (Cl. 43—98)

This invention relates to an electrocuting trap and it is particularly an object of the invention to provide a trap of this kind for use in exterminating rodents and particularly rats and mice.

The invention consists in the details of construction and in the combination and arrangement of the several parts of my improved electrocuting trap whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view in perspective of a trap constructed in accordance with an embodiment of my invention;

Figure 2 is a fragmentary view taken longitudinally through the supporting post, as herein comprised, with a coacting part in elevation; and Figure 3 is a fragmentary view in perspective of the portion of the contact plate as herein comprised.

As disclosed in the accompanying drawing, I denotes a plate of desired dimension and configuration and formed of a material readily conductive of electricity. This plate I at a predetermined point thereof and preferably closely adjacent to a margin of the plate and at the longitudinal center of such margin is provided with the upstanding lugs 2, preferably struck from the plate I. As is clearly illustrated in the accompanying drawing, each of these lugs 2 is in the form of an inverted V and is provided in a suitably positioned opening 3, through which a screw 4 or other member may be inserted to provide means for effectively holding in applied position, an upstanding post 5. The post 5 is of wood or any other desired material non-conductive of electricity and the lower end portion of the applied post 5 substantially snugly engages within the field defined by the upstanding lugs 2.

In the present embodiment of my invention, the inner face of the applied post 5 is provided therealong with a series of spaced recesses or sockets 6 into which is adapted to be selectively inserted the shank 7 of the combined contact member and bait holder C. This member C is formed of a single length of material, preferably wire, of requisite gauge and conductive of electricity. This strand of material or wire is formed to provide a circular contact member 8 of a material diameter and one end portion of this contact member 8 is continued to form the shank 7, hereinbefore referred to, and which shank 7 is at substantially right angles to the plane of the member C.

The opposite end portion of this member 8 is coiled to provide an eye 9 through which the shank 7 is snugly extended and said coil 9 is continued by an arm 10 extending inwardly of the member 8 in a direction substantially radially thereof. The inner or free end portion of this arm 10 is formed to provide a hook 11 upon which is adapted to be placed bait of a character desired. The arm 10 is of such length as to position the hook 11 at substantially the axial center of the member 8.

Clamped, as at 12, or otherwise connected to the shank 7 is a terminal of a conductor $a$ adapted for communication with a suitable source of electricity. A terminal portion of the second conductor $b$ of the electric circuit is held in proper contact with a lug 2 by one of the securing screws 4, as is particularly illustrated in Figure 1. As disclosed in the accompanying drawing, the conductors $a$ and $b$ are comprised in a cable 15 of desired length in proper connection with a plug 14 of a conventional type for coaction with the usual socket.

By selectively engaging the shank 7 within the openings 6, the member C may be readily adjusted up and down with respect to the contact plate I, as the requirements of practice may prefer.

It is believed to be obvious that a rodent in order to reach the bait upon the hook 11 must be upon the contact plate I so that just as soon as the animal touches any part of the member 8 or the arm 10, or the hook 11, the animal will be electrocuted.

From the foregoing description it is thought to be obvious that an electrocuting trap constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A contact member for an electrocuting trap to be supported above a contact plate, said contact member being formed of a single length of material formed into a loop of predetermined diameter, one end of said loop being continued to form an angularly disposed shank for engagement with a support, the opposite end of the loop being continued to provide an arm extending inwardly of the loop, the free end portion of said arm constituting a bait hook, and said arm being of a length to position the bait hook at substantially the axial center of the loop.

CLAIR T. HAZEL.